United States Patent
Quek et al.

(10) Patent No.: US 9,202,242 B2
(45) Date of Patent: Dec. 1, 2015

(54) UNIFIED CLASSIFICATION APPROACH FOR DIFFERENT TYPES OF ITEMS IN ENTERPRISE PROCUREMENT CATALOGS

(75) Inventors: Lee-Hian Quek, Foster City, CA (US); Sonal Hede, Modesto, CA (US); Mara Prieto, San Carlos, CA (US); Sudhir Subramanian, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1399 days.

(21) Appl. No.: 12/408,505

(22) Filed: Mar. 20, 2009

(65) Prior Publication Data

US 2010/0241526 A1 Sep. 23, 2010

(51) Int. Cl.
*G06Q 30/06* (2012.01)
*G06F 17/30* (2006.01)

(52) U.S. Cl.
CPC ...... *G06Q 30/0603* (2013.01); *G06F 17/30554* (2013.01); *G06Q 30/0601* (2013.01)

(58) Field of Classification Search
USPC ........... 705/30, 34, 26.1, 27.1, 27.2; 235/375, 235/380, 383, 385; 707/E17.014, E17.044, 707/999.003
See application file for complete search history.

(56) References Cited

U.S. PATENT DOCUMENTS

| | | | | |
|---|---|---|---|---|
| 5,319,542 A * | 6/1994 | King et al. | | 705/26.81 |
| 6,032,130 A * | 2/2000 | Alloul et al. | | 705/14.34 |
| 6,405,176 B1 * | 6/2002 | Toohey | | 705/26.8 |
| 6,487,545 B1 * | 11/2002 | Wical | | 706/45 |
| 6,578,030 B1 * | 6/2003 | Wilmsen et al. | | 1/1 |
| 7,035,817 B1 * | 4/2006 | Brothers | | 705/51 |
| 7,139,769 B2 * | 11/2006 | Ouchi | | 1/1 |
| 7,349,917 B2 * | 3/2008 | Forman et al. | | 1/1 |
| 7,392,934 B2 * | 7/2008 | Hahn-Carlson et al. | | 235/379 |
| 7,512,548 B1 * | 3/2009 | Bezos et al. | | 705/26.1 |
| 7,603,348 B2 * | 10/2009 | He et al. | | 1/1 |
| 7,676,407 B2 * | 3/2010 | Van De Van et al. | | 705/35 |
| 7,716,088 B2 * | 5/2010 | Spiegel et al. | | 705/26.7 |
| 7,725,364 B2 * | 5/2010 | Tanaka et al. | | 705/27.1 |
| 7,734,506 B2 * | 6/2010 | Ouchi | | 705/26.62 |
| 7,752,238 B2 * | 7/2010 | Wilmsen et al. | | 707/811 |
| 7,860,902 B2 * | 12/2010 | Brendle et al. | | 707/809 |

(Continued)

OTHER PUBLICATIONS

Oracle Data Sheet entitled "Peoplesoft Purchasing"; Copyright 2003, 2005 and 2007; obtained at http://expobadge.com/dldev/dc/file/PeopleSoft%20PurchasingDS.pdf; 11 pages.

*Primary Examiner* — Andrew Joseph Rudy
(74) *Attorney, Agent, or Firm* — Trellis IP Law Group, PC

(57) ABSTRACT

Particular embodiments provide an order procurement application to allow users to search for items in an order procurement catalog. A classification of items in the order procurement catalog is determined. A plurality of different types of items are classified. The different types may be characterized by different methods of ordering that are needed to order an item of the type. During searching, a query for the order procurement catalog may be received. A classification position may be determined based on the query. For example, a node in a hierarchy may be determined. Ancestor and descendant positions in the classification may also be determined, such as ancestor and descendant nodes for the current node. A plurality of items is then determined for the classification position, ancestor position, and descendant position. The plurality of items that are determined may then be displayed to a user in response to the query.

20 Claims, 7 Drawing Sheets

(56) References Cited

U.S. PATENT DOCUMENTS

| | | |
|---|---|---|
| 7,894,936 B2 * | 2/2011 | Walker et al. ................ 700/238 |
| 7,904,929 B1 * | 3/2011 | Jaunin et al. ................... 725/86 |
| 7,945,636 B2 * | 5/2011 | Nelson et al. ................ 709/217 |
| 8,126,785 B2 * | 2/2012 | Hahn-Carlson et al. ........ 705/30 |
| 8,249,885 B2 * | 8/2012 | Berkowitz et al. ............. 705/1.1 |
| 8,463,658 B2 * | 6/2013 | Racco ......................... 705/26.1 |
| 8,468,060 B2 * | 6/2013 | Robb et al. .................. 705/26.1 |

* cited by examiner

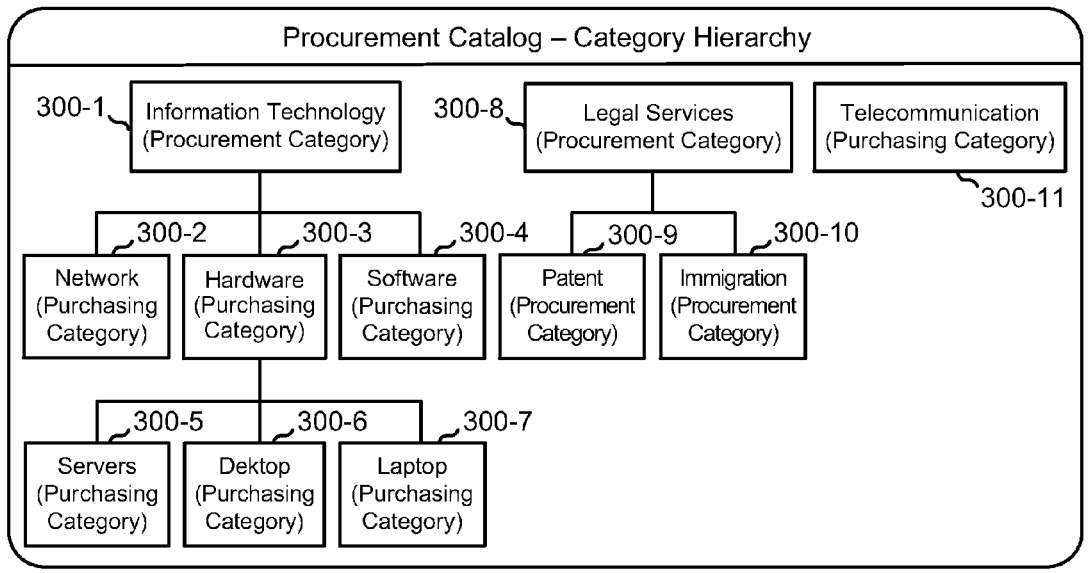

*Fig. 3A*

| Content Type | Item | Associated Category | Indexed Category |
|---|---|---|---|
| Local Catalog | Hard Disk 2GB | Hardware | Information Technology, Hardware, Servers, Desktop, Laptop |
| Local Catalog | Computer Model 220 | Laptop | Information Technology, Hardware, Laptop |
| Local Catalog | Computer Model 4000 | Server | Information Technology, Hardware, Server |
| Informational Catalog | Non-Standard Software Request | Software | Information Technology, Software |
| Punchout | Computer Manufacturer | Desktop and Laptop | Information Technology, Hardware, Desktop, Laptop |
| Smart Forms | Law Firm | Immigration | Legal Services, Immigration |
| Informational Catalog | Cell Phone | Telecommunication | Telecommunication |

UNIFIED CLASSIFICATION APPROACH FOR DIFFERENT TYPES OF ITEMS IN ENTERPRISE PROCUREMENT CATALOGS

BACKGROUND

Particular embodiments generally relate to providing search results for a procurement catalog.

An enterprise procurement application manages a procurement catalog of items that services the needs of the enterprise's employees. The procurement application may be used by employees to order items from the procurement catalog. A user can search the procurement catalog to find internal items. In some cases, the item the user desires may not be included among the internal items and the user cannot use the enterprise procurement application to order the item. Rather, the user uses a different avenue to order the item, such as independently ordering the item through an external company's website. Because the user cannot use the procurement application, the user may need to use another application to order the item. This causes the user to perform another search to find the item in a different application, which is not an efficient use of the user's time.

SUMMARY

Particular embodiments provide an order procurement application to allow users to search for items in an order procurement catalog. A classification of items in the order procurement catalog is determined. A plurality of different types of items are classified. For example, the different types of items may include an internal type, a punch-out type, a form type, and/or an informational type. Other types may also be appreciated. The different types may be characterized by different methods of ordering that are needed to order an item of the type.

During searching, a query for the order procurement catalog may be received. For example, a user may be searching or browsing using the order procurement application. A classification position may be determined based on the query. For example, a node in a hierarchy may be determined. Ancestor and descendant positions in the classification may also be determined, such as ancestor and descendant nodes for the current node. A plurality of items is then determined for the classification position, ancestor position, and descendant position. Indexing for items may be generated and are used to determine the items that satisfy the query. The plurality of items may include multiple types of items, such as an internal, form, informational, or punch-out item. Thus, a user may search for different types of items in addition to receiving results from ancestor and descendant nodes. The plurality of items that are determined may then be displayed to a user in response to the query.

A further understanding of the nature and the advantages of particular embodiments disclosed herein may be realized by reference of the remaining portions of the specification and the attached drawings.

BRIEF DESCRIPTION OF THE DRAWINGS

FIGS. 3A and 3B show an example of a second hierarchy in addition to a table that classifies items according to one embodiment.

FIG. 6 shows an example of an interface for searching a procurement catalog according to one embodiment.

FIG. 7 depicts a second example of an interface according to one embodiment.

DETAILED DESCRIPTION OF EMBODIMENTS

Figure 1:
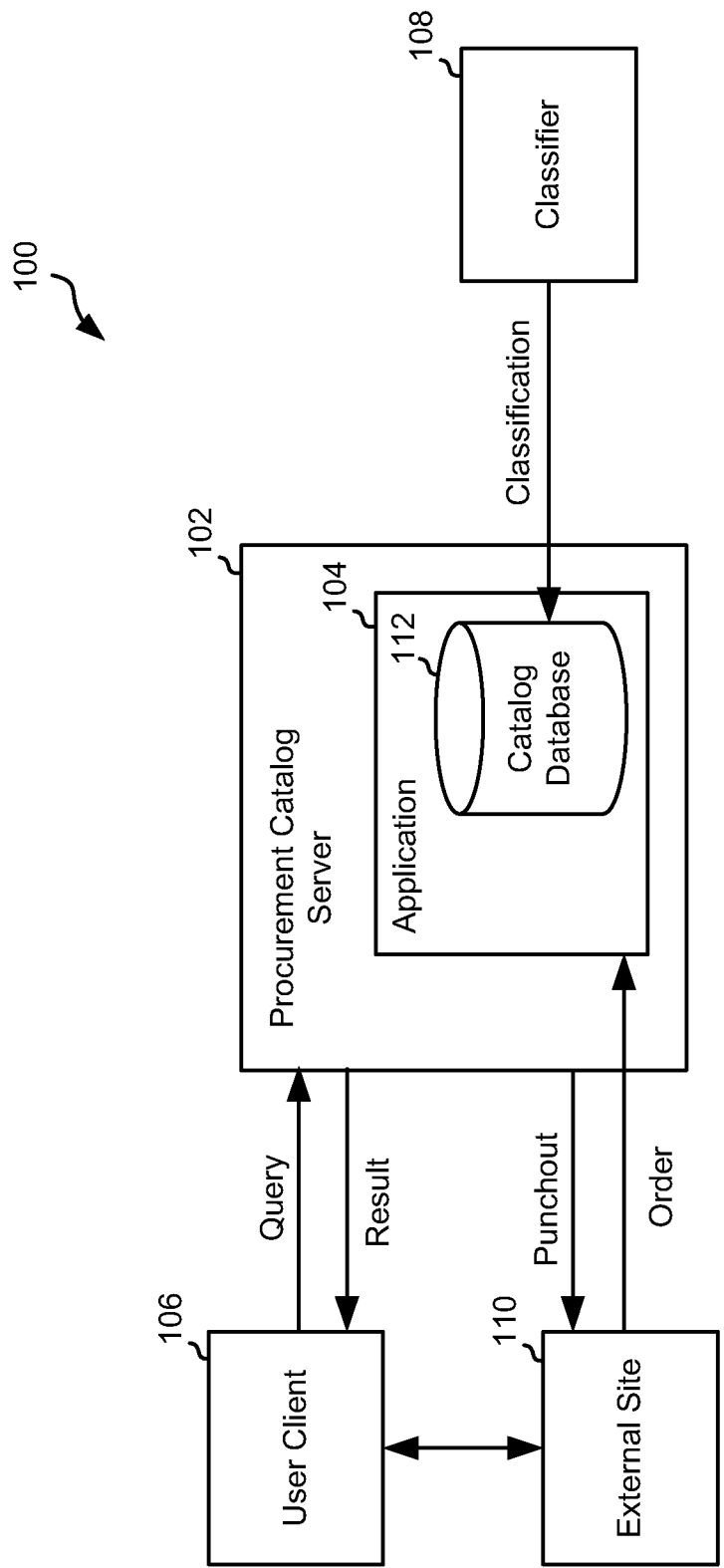
FIG. 1 depicts a simplified system for providing a procurement catalog according to one embodiment.

FIG. 1 depicts a simplified system 100 for providing a procurement catalog according to one embodiment. System 100 includes a procurement catalog server 102 that includes a procurement catalog application 104. A user client 106, a classifier 108, and an external site 110 are also provided. Other devices may be found in system 100 but are not shown.

Procurement catalog server 102 may be any computing device or system of computing devices that can provide catalog results to user client 106. It will be understood that functions of server 102 may be distributed to other computing devices.

Procurement catalog server 102 includes application 104 and a procurement catalog database 112. Procurement catalog application 104 may be an enterprise application that may be used by employees of the enterprise to search for items. Application 104 manages the procurement catalog, which is stored in catalog database 112. The items may be anything that can be ordered by a user, such as goods, services, etc. A procurement catalog is a listing of items that can be used by employees of an enterprise to order the items. The application used may be internal to the enterprise and only used by employees of the enterprise.

User client 106 may be any computing device which a user uses to query for items in the procurement catalog. A query may be any information that is used to determine items in the procurement catalog. For example, a query may include searching or browsing the procurement catalog. Searching requires a user to issue a search term and the search results may include items that are indexed with the search term. Browsing enables a user to navigate through a category hierarchy. Search results are returned based on a position in the hierarchy in which the user has browsed.

The procurement catalog may include different types of items. For example, a type of item may be where a different method of ordering is required. In one embodiment, the types include an internal type, a punch-out type, a form type, and an informational type. The internal type may be an item that is offered internally by the enterprise. For example, an internal item may be items that are stocked by the enterprise in inventory or negotiated items with a supplier that are pre-defined internally within the application.

A punch-out type is where a link to an external supplier site is provided such that the user may be navigated to the external site automatically from procurement catalog application 104. The user may then shop within the interface of the supplier site. An example of a punch-out is to an external computer website in which a user can use the external site to purchase a computer. In one embodiment, by providing an automatic punch-out from enterprise procurement application 104, the user may order the item from the external site without having to navigate to the web-site (or item) again, such as by opening another application (e.g., web browser window), and ordering the item on the external website. Also, the external punchout may have automated billing facilitated by application 104. In this case, application 104 may have an agreement with the external site such that the item can be purchased based on agreements with the enterprise. For example, the user may not need to enter in their personal purchase information, such as a personal credit card; rather, the purchase is billed directly to the enterprise. Also, the content of the external site can be tailored to the enterprise providing the punchout to the supplier. Customizations include only certain items are displayed and the price could be per an agreement between supplier and enterprise. Thus, by providing a punchout from the procurement catalog, employees can easily take advantage of customizations offered by the supplier that may not have been available or easily retrieved if the employees had separately navigated to the external site.

A form may be a custom request form that allows a user to specify a requested item that is not available in the local catalog or through a punch-out supplier site. An example is a business card form that allows a user to specify details that need to be printed on a business card. The form may then be sent to an entity in which business cards can be printed and returned to the user. The form may be a smart form in that it includes some intelligence that formats the form for what the user is requesting. For example, if the user is requesting business cards, the form guides the user as to what information is needed to order the business cards (e.g., name, title, etc.).

An informational item may be an item that allows the enterprise to provide instructions on how to request/purchase an item that is not available in the local catalog or through a punch-out or a form. For example, if an enterprise does not have a pre-negotiated contract with a cell phone provider, the enterprise can create an informational catalog item that contains instructions on how to request a cell phone for its employees.

The different method of ordering may be a characteristic of what a user has to do to order the type of item. For example, external items need to be ordered through an external website or entity. Also, forms require the user to fill out a form while an internal item may be ordered directly through application 104. The method may be the steps that may be taken by the user to order the item and how the item is ordered by the enterprise. For example, the form may be filled out and is then reviewed by the enterprise to order the item noted on the form. The internal item may be stocked by the enterprise. The different methods of ordering do not affect the user that is ordering the item. Procurement catalog application 104 is configured to perform the necessary processing to order the item in the different methods and the user does not need to worry about how to order the different items.

A classifier 108 is used to classify the types of items for the enterprise. For example, different categories may be assigned to items based on the classification assigned to the item. In one example, a computer may be classified in a laptop category. Particular embodiments classify the different types of items in a single classification. For example, the local items, punch-out items, forms items and informational items are classified using the same classification system. In this case, a user can search for different types of items in a single search and be returned different types of items. Conventionally, a user may have only been able to search for local items in a procurement catalog. If the user could not find the local item, then the user would have to use a different application for searching for any external items. However, particular embodiments provide an ease of use by allowing users to use application 104 to search for different types of items. For example, application 104 may facilitate a punch-out to an external site 110. User client 106 may then interact with external site 110 to order the item. The order of the item may be communicated back to application 104 from external site 110 in one embodiment. In other embodiments, the order may be communicated back to user client 106.

In addition to allowing a user to browse for different item types using application 104, particular embodiments provide a user with robust search results based on the classification system. For example, the classification may include categories in a category hierarchy. When a user queries for a node in the hierarchy, ancestor and descendant nodes of the category hierarchy may be included in the search results. This allows the search results for items in any of the ancestor or descendant nodes to be returned. This may be useful as a user does not have to search or browse through the different levels of the hierarchy to find the item they desire. Rather, if a user is within the ancestor or descendant line of the hierarchy, the user will be returned search results that include the item. The ancestor or descendant line may be determined by tracing a path from the node up and down the hierarchy. A node may not be in the path if it is in a leaf node that would require retracing of the path in the opposite direction. For example, nodes on the same level of hierarchy may not be considered ancestor or descendant nodes. It will be understood that method other than returning of search results of the ancestor and descendant nodes may be used. For example, a user may want to see products from a different leaf because they are related. For example, a printer and paper, which could be in different parts of the hierarchy, but, procurement catalog application 104 may help the user order the paper as the user is buying printers.

Figure 2:
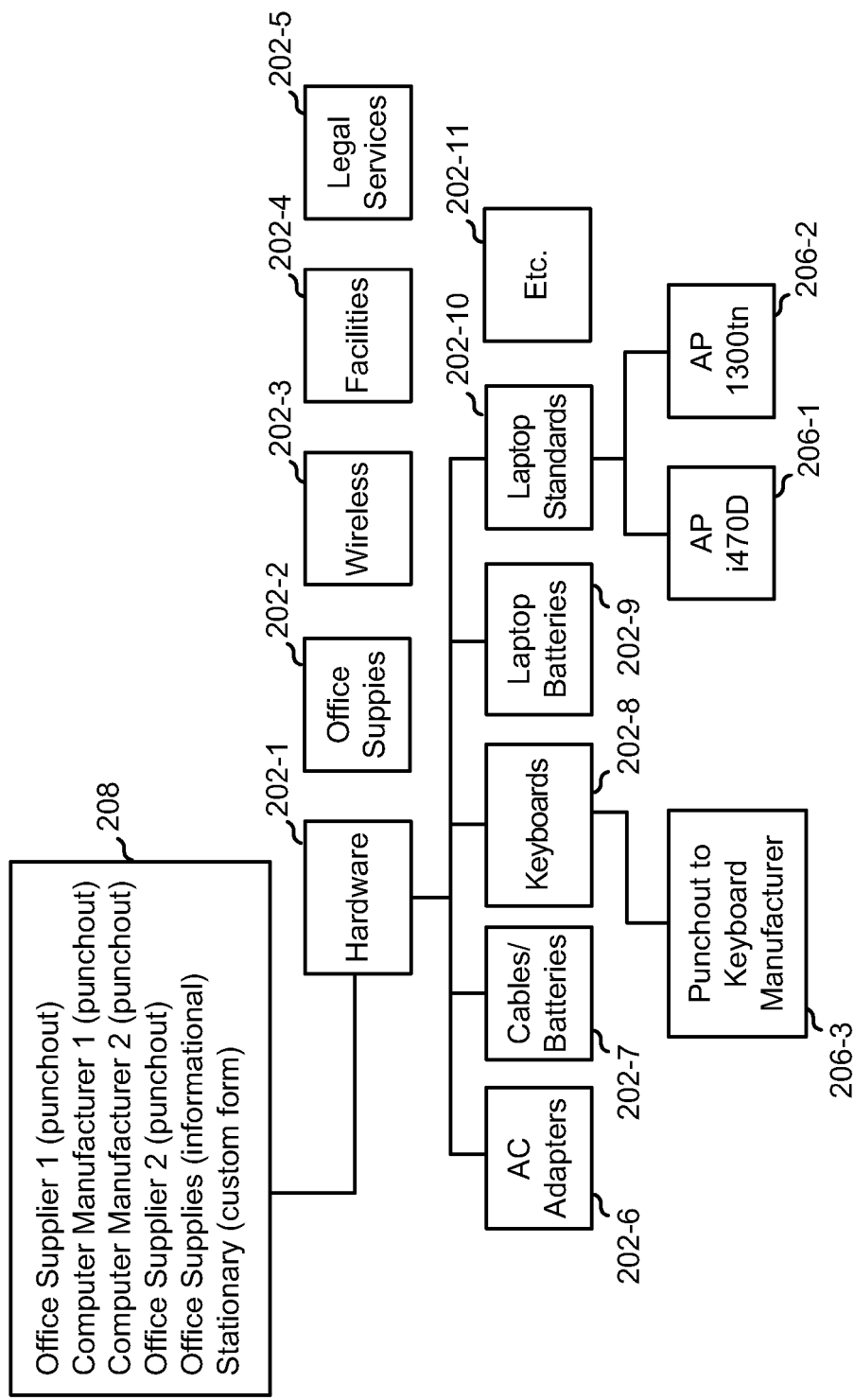
FIG. 2 depicts an example of a hierarchy according to one embodiment.

FIG. 2 depicts an example of a hierarchy according to one embodiment. A plurality of categories may be included in the classification. The categories may be arranged in a hierarchy. Although a hierarchy is described, it will be understood that other classification systems may be used. In one example, the categories may be arranged in nodes. As shown, categories 202 may be a first level of categories. These categories may be separate categories in the procurement catalog. For example, hardware category 202-1 may be expanded into a second level of categories 202-6 to 202-11. Additional levels of categories 202 may also be provided. However, items 206 may be included under the second level of categories. For example, local items 206-1 and 206-2 are provided. Also, a punch-out to a keyboard manufacturer item 206-3 is provided.

Connected to hardware 202-1, items 208 may be items that are associated with any category in the hardware branch. For example, as the user navigates down the hierarchy, these items may always be returned as search results. For example, different punch-outs, informational, and form items may be provided as the user searches different categories in the hardware branch. This may allow a user to punch out, fill out a form, or be provided information at any time. In one example, an office supplier punch-out may be provided for all categories in the hardware branch because at any point in the hierarchy the user may desire to punch-out to the office supplier.

Additionally, particular embodiments may return descendant and ancestor nodes based on their position in the classification. For example, if a user has navigated to laptop standards category 202-10, the user may be returned results from local items 206-1 and 206-2 in addition to any items found in hardware category 202-1. This may include items 208. When a user navigates to keyboards category 202-8, the user may be returned the punch-out item 206-3 and any items in hardware 202-1, which may include items 208.

FIGS. 3A and 3B show an example of a second hierarchy in addition to a table that classifies items according to one embodiment. As shown, FIG. 3A shows a hierarchy of categories 300. FIG. 3B shows a table 310 that includes items 304 that have been classified. Items may be classified by content type 302, associated categories 306, and index categories 308.

Content type 302 may be the type of item. For example, the item may be a local item available in a local catalog, an informational item labeled in the table as an informational catalog, a punch-out, and a form that is labeled smart form in the table.

Item 304 describes the item that may be ordered. Associated category 306 is the category name in which the item has been categorized. For example, hard disk 2 GB is associated with the hardware category. Also, computer model 220 is associated with the laptop category. In this case, when a user has navigated to one of these categories, this item may be returned because it has been classified in that category. Indexed categories 308 provide an index that may associate an item with other linked categories. For example, ancestor and descendant nodes may be indexed in indexed categories 308. That is, if an associated category is selected, then the ancestor and descendant nodes may be pre-indexed for that category. Thus, when one of the categories is determined for a query, then all items that have been indexed with that category are returned. For Computer model 220, when the category Information, Hardware, or Laptop is determined for a query, the item is returned as a search result. This indexing basically computes the ancestor and descendant nodes for an item. Additionally, other nodes that may not be direct ancestor or descendant nodes may also be indexed here.

Table 310 provides a representation of a classification that may be stored in database 112. For example, associated category 306 may be used by application 104 to return search results. For example, when a category is navigated to by a user, application 104 may use table 310 to determine which items to return. For example, a user may navigate from information technology to hardware to look for a new laptop. At this level, a user may find local items hard disk 2 GB, computer model 220, and a computer manufacturer punch-out. The user can review the item description of computer model 220, decide if the user wants to purchase that item or punch out to the computer manufacturer's website to look for another laptop.

Because the user was at the hierarchy laptop 300-7, items that have been associated with the laptop category are returned. Also, computer model 220 and the computer manufacturer punch-out are found in the laptop category. Hard disk 2 GB is found in the hardware category, which is not the laptop category, but is returned in the search results. This is because the ancestor node of hardware is searched for items that may be of interest for the user.

In one embodiment, indexed categories 308 provide an index for an item. In this case, indexed category 308 for hard disk 2 GB includes the laptop category and thus returned when the laptop category is determined. Indexed categories 308 provide application 104 with indexes to use to determine which items to return. In this case, indexed categories 308 may be searched for laptop and items indexed with the laptop category are returned. The indexing that is performed is meant to return ancestor and descendant nodes for search results in addition to the current category.

The indexing may be automatic. For example, once an item is classified as the hardware category, classifier 108 may automatically classify it with ancestor and descendant nodes. For example, hard disk 2 GB is indexed with information technology, hardware, servers, desktop, and laptop. In this case, these are the nodes that are ancestor and descendants of the hardware node.

In another example, if a user is looking to purchase non-standard software, the user may find the non-standard software instructions as an informational item. In this case, the user may be browsing but cannot find the software the user desires. However, in the software category, an informational item of non-standard software request may be found. This item may include instructions for ordering non-standard software. The user may find this informational item in the information technology and the software category.

In a third example, if the user is looking to request a cell phone, the user may navigate to the telecommunication category 300-11. The informational item for cell phone may be found in this category. The item may contain instructions on how the user should go about purchasing a cell phone. By providing this informational item in the procurement catalog, the user may figure out how to order an item while browsing the procurement catalog. Previously, the instructions may have been located in a different area, which can be difficult for a user to find the relevant information.

Figure 4B:
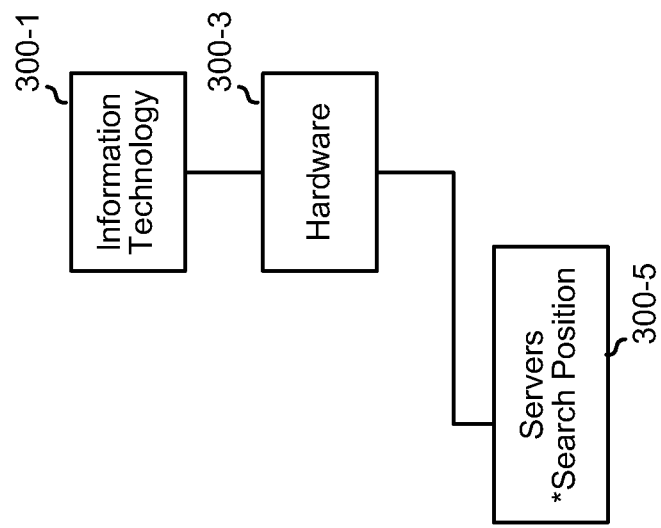
FIG. 4B shows a dynamically changed hierarchy according to one embodiment.
Figure 4A:
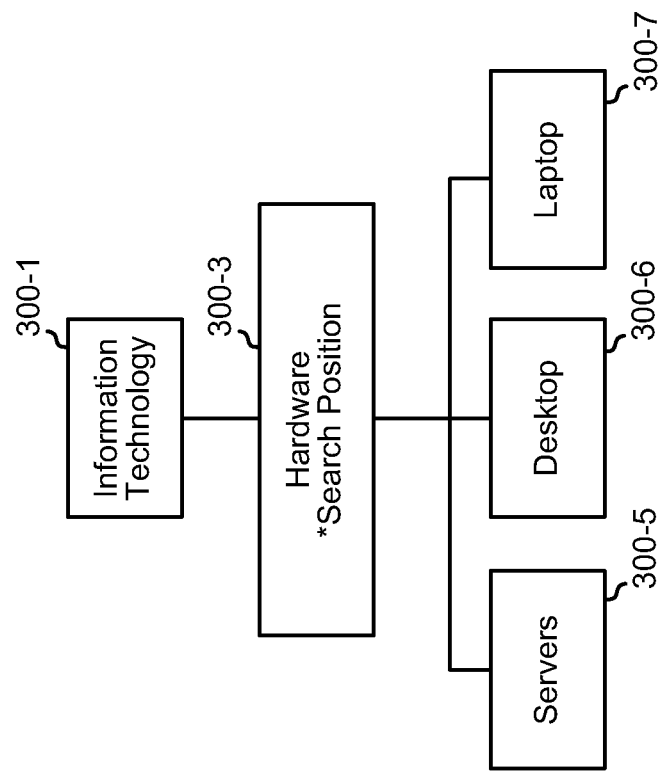
FIG. 4A shows when a user has navigated to category in the hierarchy.

As mentioned above, the navigation through the hierarchy may cause different ancestor and descendant nodes to be returned as search results. For example, a dynamic hierarchy may be generated based on a position in the hierarchy. FIGS. 4A and 4B depict a dynamic changing of a hierarchy that is returned as search results according to one embodiment. FIG. 4A shows when a user has navigated to category 300-3 either through a search or browse. For example, the search term may return the hardware category. In this case, the user may be looking for hardware. The hierarchy that is returned may be items found in information technology category 300-1, hardware category 300-3 (marked by "*search position), server category 300-5, desktop category 300-6, and laptop category 300-7. These include the ancestor and descendant nodes of hardware category 300-3.

The user may decide that a server may be more appropriate to what the user is looking for. In this case, the user may navigate to server category 300-5 (marked by "*search position). FIG. 4B shows a dynamically changed hierarchy according to one embodiment. The hierarchy is then dynamically changed to be information technology 300-1, hardware category 300-3, and server category 300-5. Thus, desktop category 300-6 and laptop category 300-7 have been removed. This is because the desktop and laptop categories are not ancestor and descendant nodes of server category 300-5. Because a user has moved or drilled down to the server category, it is assumed that the user does not wish to look at desktop computers or laptop computers. This method of returning items for the categories provides an efficient search. For example, when the user was at the hardware category, it was possible that the user was looking for servers, desktops, or laptops. However, when the user drilled down to servers, it can be assumed the user is not looking for desktops or laptops.

Figure 5:
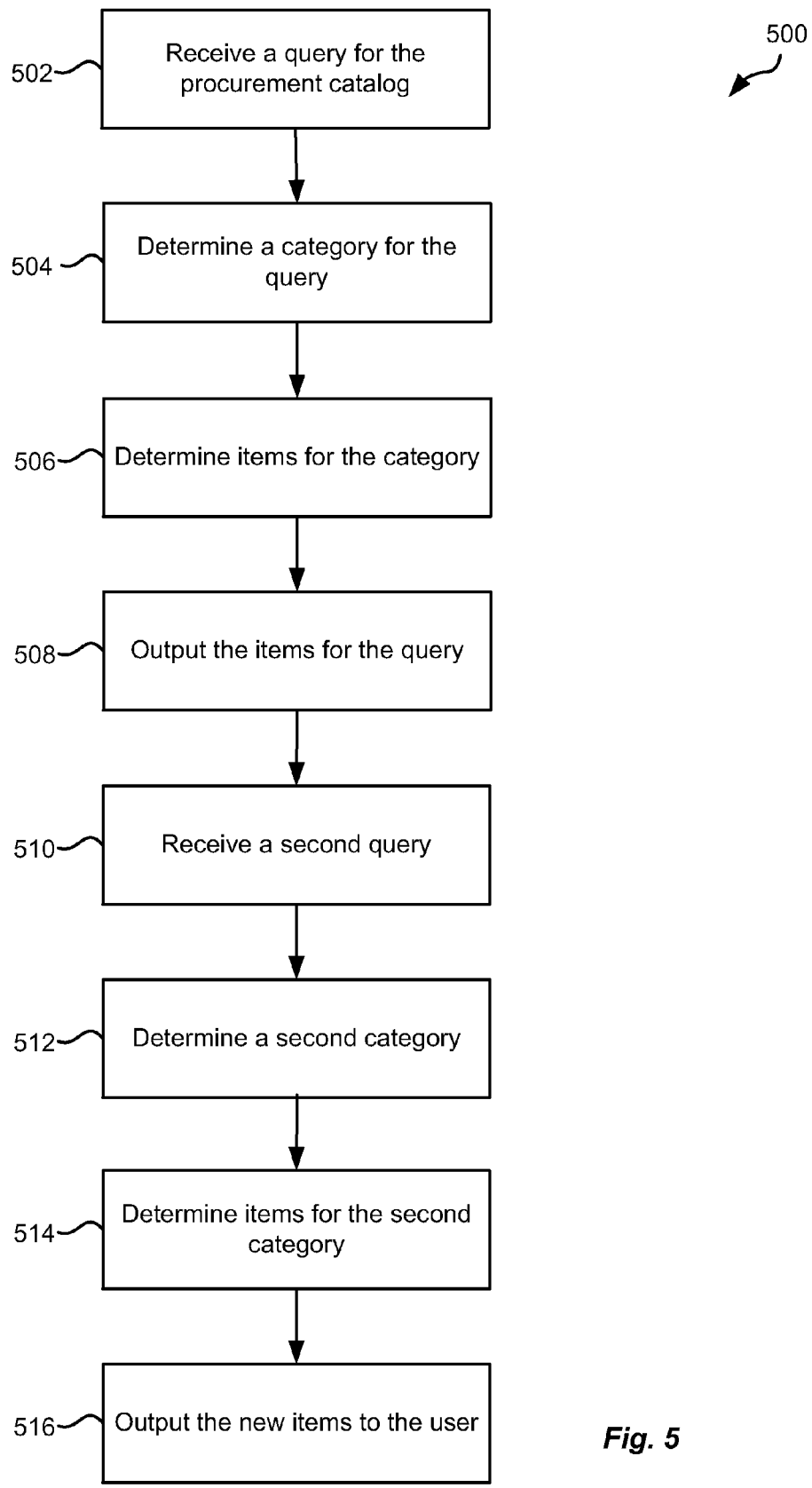
FIG. 5 depicts a simplified flowchart of a method for querying the procurement catalog according to one embodiment.

FIG. 5 depicts a simplified flowchart 500 of a method for querying the procurement catalog according to one embodiment. Step 502 receives a query for the procurement catalog. For example, procurement catalog server 102 may receive the query. The query may be a search or browse of the procurement catalog.

In step 504, application 104 determines a category for the query. For example, the browsing may specify a category. Also, the search may include a search term that is associated with a category.

In step 506, application 104 determines items for the category. The items may include linked nodes. For example, ancestor nodes and descendant nodes are determined for the category. As mentioned above, items may be associated with multiple indexed categories and all items indexed with this category are determined.

In step 508, application 104 outputs the items for the query. For example, the items may be displayed at user client 106.

In step 510, application 104 receives a second query. The second query may be the user navigates to a different category or defines the search terms more specifically. In step 512, application 104 determines a second category. The second category may be a different category from the category determined in step 504. This may cause an adjustment of what node the user is on in the hierarchy.

Step 514 then determines items for the second category. For example, items for ancestor and descendant nodes are determined in addition to items for the category. Step 516 then outputs the new items to the user.

Figure 6:
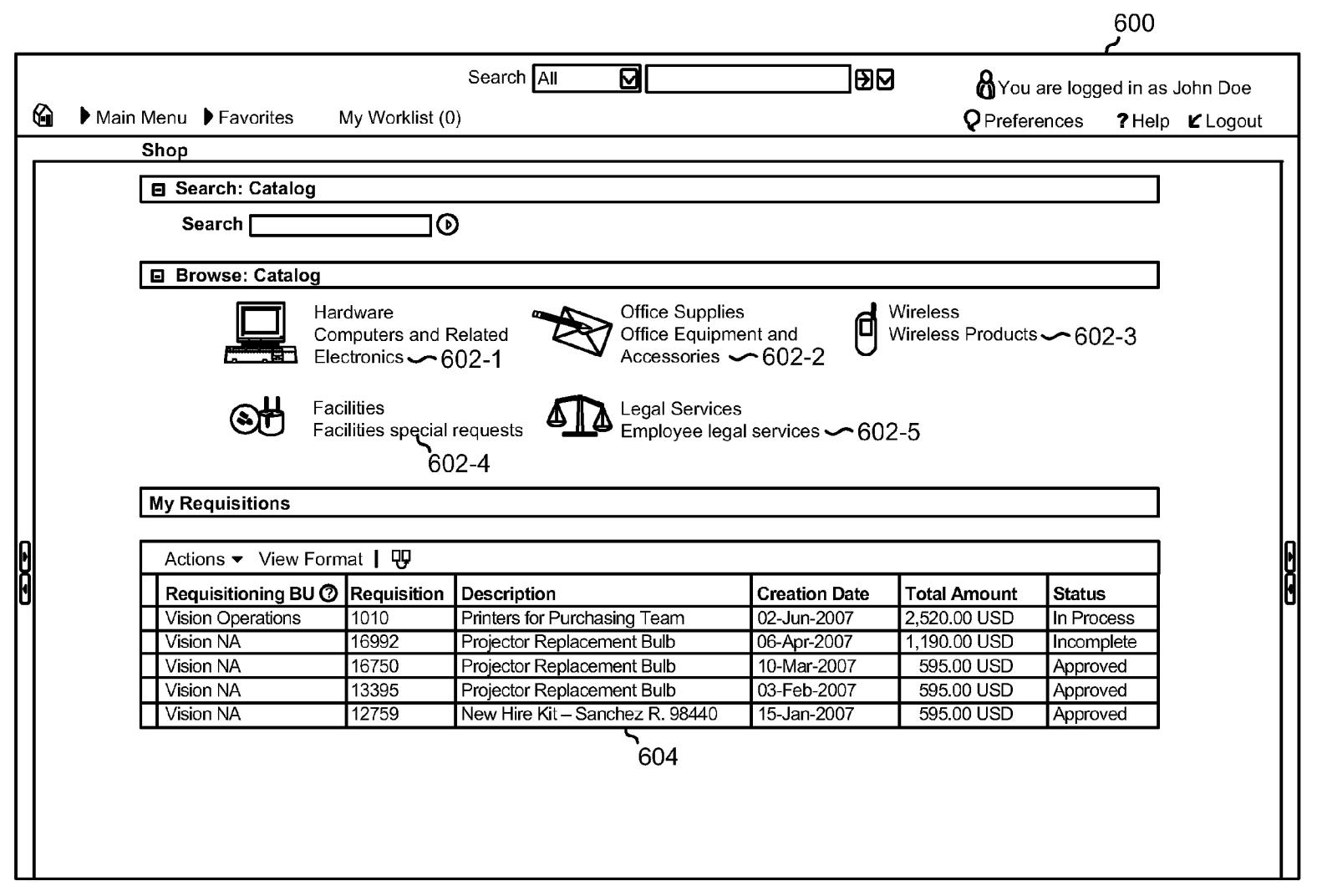

FIG. 6 shows an example of an interface 600 for searching a procurement catalog according to one embodiment. Different categories 602 are shown on a home page. These categories may be used by a user to search for items. For example, when category hardware 602-1 is selected, search results are presented for all options to order hardware. A requisitions section 604 represents orders that have been placed previously. For example, orders for internal items and items ordered using forms, punch-outs, or informational types may be displayed here. Accordingly, users may order items other than local items and have them stored in application 104. In this case, interface 600 allows a user to see items that have been bought for different types of items. A user can aggregate the items ordered through different methods in interface 600. This makes it easier for a user to review which items have been ordered.

Figure 7:
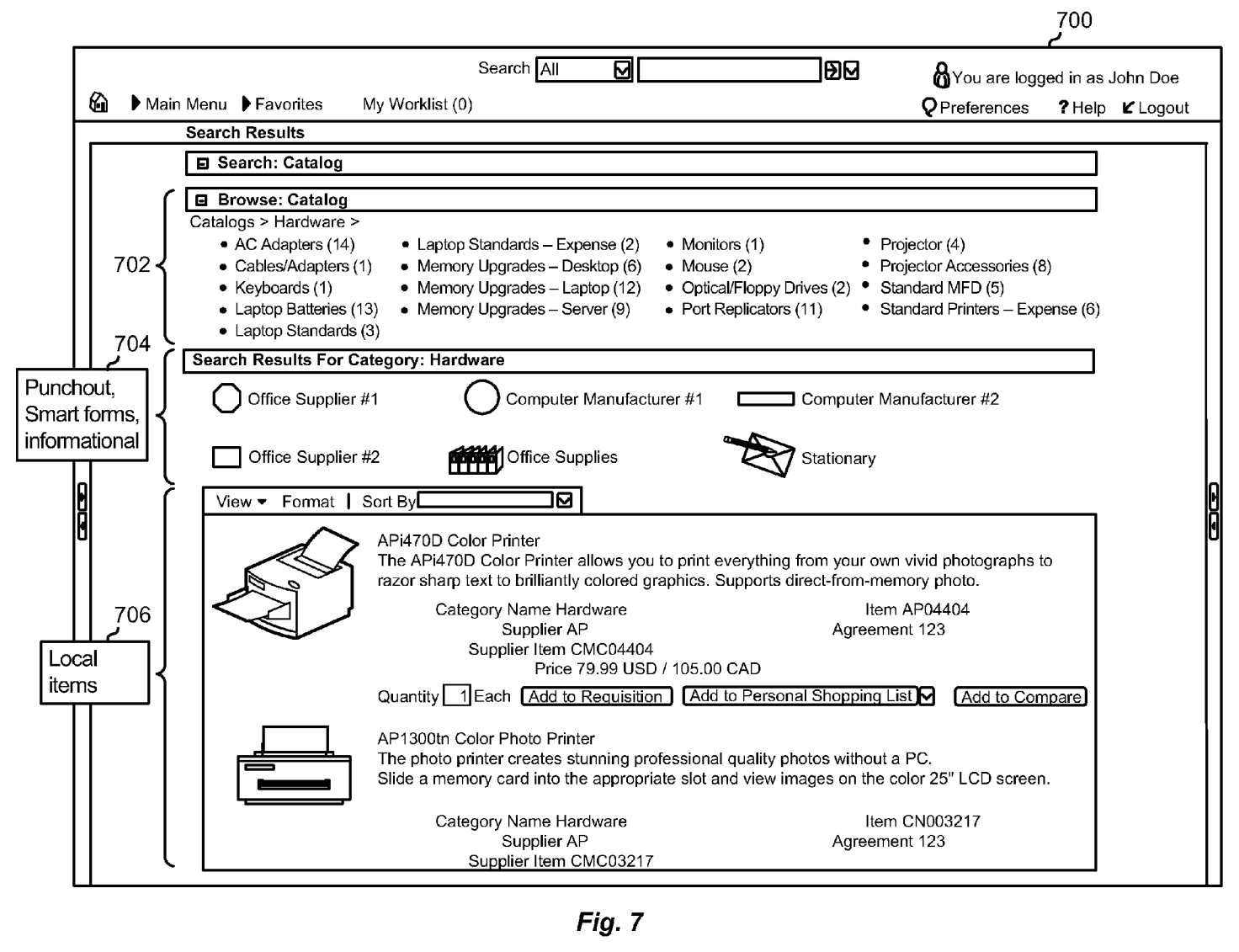

Once the user selects the category hardware, a second interface may be displayed. FIG. 7 depicts an example of an interface 700 according to one embodiment. For the category hardware, a section 702 shows the different items found for that category. In this case, any ancestor and descendant nodes of the category hardware may be provided. When additional categories are shown, they may be selected again.

Also, a punch-out form and informational section 704 shows any items of these types. The user may select the different items and be provided with different actions. For example, if office supplier number one is selected, a punch-out to the website of office supplier number one is provided. Also, if office supplies is selected, an informational item is displayed that may tell the user how to order office supplies. Additionally, if a stationery item is selected, a form for ordering stationery is provided. The user may fill out the form and have it automatically routed to the proper department.

A local items section 706 displays items of the internal type. For example, two different printers are shown. Other results may also be provided but are not shown in interface 700.

Particular embodiments provide many advantages. For example, a consistent way to classify different types of items is used and provides a user a method to find all types that are associated with a category. This provides a searching and browsing experience in which the user can obtain all relevant items when browsing at any level of a classification hierarchy. Application 104 automatically retrieves all items that are associated with the descendants of a selected node. All items associated with any nodes in the hierarchy are automatically indexed with categories of the ancestor and descendant nodes and thus search results can be returned when the index categories are used as a search term. This provides efficient searching and browsing for a user.

Although the description has been described with respect to particular embodiments thereof, these particular embodiments are merely illustrative, and not restrictive. Although procurement catalogs are described, it will be understood that particular embodiments may be used with other items that require searching and browsing.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method executed by a procurement catalog server and an enterprise procurement application coupled to one or more clients and one or more external sites over a network connection, the method comprising:

determining a classification of items in an order procurement catalog retrieved from a procurement catalog database, the order procurement catalog allowing a user to order an item, the classification organizing a plurality of types of items in the classification amongst categories;

arranging the categories as a plurality of nodes in a category hierarchy;

tracing a path along the category hierarchy to determine an ancestral relationship between the plurality of nodes;

analyzing a tracing direction of the path to identify adjacent nodes at a same level in the hierarchy;

receiving, from the client over the network connection, a query for an item using the enterprise procurement application for the order procurement catalog, the enterprise procurement application configured to allow a user in an enterprise to order items from the order procurement catalog over the network using the client;

determining a plurality of items for the query based upon the category in which the item is included, with said category including related items associated with nodes adjacent to the node to which the item is associated, wherein the plurality of items includes a first type of item and a second type of item, wherein the first type of item requires a different method of ordering from the second type of item; and displaying the plurality of items, including the related items, in response to the query for procurement by the user thereof.

2. The method of claim 1, wherein a type of item in the plurality of types comprises a punchout type, the punchout type being a link to an external supplier site from an internal site.

3. The method of claim 2, wherein the punchout type is listed in the procurement application.

4. The method of claim 1, wherein a type of item in the plurality of types comprises a form type, the form type including a form that allows a user to order an item that is not found in the procurement catalog.

5. The method of claim 1, wherein a type of item in the plurality of types comprises an informational type, the informational type including information that guides a user to order an item that is not found in the procurement catalog.

6. The method of claim 1, wherein a type of item in the plurality of types comprises an internal type, the internal type including an item that is offered internally by the enterprise in the procurement catalog.

7. The method of claim 1, further comprising:
determining a classification position in the classification based on the query; and
determining antecedent and descendant positions in the classification.

8. The method of claim 7, further comprising:
receiving a second query for the order procurement catalog;
determining a second position in the classification, wherein the second position provides different antecedent or descendant positions; and
automatically determining a second plurality of items based on the second position and the different antecedent or descendant positions.

9. The method of claim 8, wherein the classification comprises a hierarchy, wherein a leaf node not within the antecedent and descendant positions is removed from the plurality of items when the second query is received.

10. The method of claim 1, wherein the query comprises a search or browse for an item.

11. The method of claim 1, wherein the classification indexes items with a category and additional categories based on ancestor and descendant nodes for the category in the classification.

12. The method of claim 1, wherein the related items comprise different types of items positioned at a same level of the category hierarchy as the item.

13. A non-transitory computer-readable medium comprising encoded logic for execution by the one or more processors of a procurement catalog server coupled to one or more clients over a network, the logic when executed is operable to:
determine a classification of items in an order procurement catalog retrieved from a procurement catalog database, the order procurement catalog allowing a user to order an item, the classification organizing a plurality of types of items in the classification amongst categories;
arrange the categories as a plurality of nodes in a category hierarchy;
trace a path along the category hierarchy to determine an ancestral relationship between the plurality of nodes;
analyze a tracing direction of the path to identify adjacent nodes at the same level in the hierarchy;
receive, from the client over the network, a query for an item using an enterprise procurement application for the order procurement catalog, the enterprise procurement application configured to allow a user in an enterprise to order items from the order procurement catalog over the network using the client;
determine a plurality of items for the query based upon the category in which the item is included, with said category including related items associated with nodes adjacent to the node to which the item is associated, wherein the plurality of items includes a first type of item and a second type of item, wherein the first type of item requires a different method of ordering from the second type of item; and
display the plurality of items, including the related items, in response to the query for procurement by the user thereof.

14. The computer-readable medium of claim 12, wherein a type of item in the plurality of types comprises a punchout type, the punchout type being a link to an external supplier site from an internal site.

15. The computer-readable medium of claim 12, wherein a type of item in the plurality of types comprises a form type, the form type including a form that allows a user to order an item that is not found in the procurement catalog.

16. The computer-readable medium of claim 12, wherein a type of item in the plurality of types comprises an informational type, the informational type including information that guides a user to order an item that is not found in the procurement catalog.

17. The computer-readable medium of claim 12, wherein a type of item in the plurality of types comprises an internal type, the internal type including an item that is offered internally by the enterprise in the procurement catalog.

18. The computer-readable medium of claim 13, wherein the classification indexes items with a category and additional categories based on ancestor and descendant nodes for the category in the classification.

19. The computer-readable medium of claim 13, wherein the classification comprises a hierarchy that includes different levels classified by categories, wherein different types of items are in a same level of the hierarchy.

20. An apparatus comprising:
one or more processors; and
logic encoded in one or more tangible media for execution by the one or more processors and when executed operable to:
determine a classification of items in an order procurement catalog retrieved from a procurement catalog database, the order procurement catalog allowing a user to order an item, the classification organizing a plurality of types of items in the classification amongst categories;

arrange the categories as a plurality of nodes in a category hierarchy;

trace a path along the category hierarchy to determine an ancestral relationship between the plurality of nodes;

analyze a tracing direction of the path to identify adjacent nodes at the same level in the hierarchy;

receive, from a client over a network connection, a query for an item using an enterprise procurement application for the order procurement catalog, the enterprise procurement application configured to allow a user in an enterprise to order items from the order procurement catalog over the network using the client;

determine a plurality of items for the query based upon the category in which the item is included, with said category including related items associated with nodes adjacent to the node to which the item is associated, wherein the plurality of items includes a first type of item and a second type of item, wherein the first type of item requires a different method of ordering from the second type of item; and display the plurality, including the related items, of items in response to the query for procurement by the user thereof.

* * * * *